US012353696B2

(12) United States Patent
Sidman

(10) Patent No.: US 12,353,696 B2
(45) Date of Patent: Jul. 8, 2025

(54) APPARATUSES, METHODS AND SYSTEMS FOR HIERARCHICAL MULTIDIMENSIONAL INFORMATION INTERFACES

(71) Applicant: Content Directions Inc., New York, NY (US)

(72) Inventor: David Sidman, Brooklyn, NY (US)

(73) Assignee: Content Directions. Inc, Brooklyn, NY (US)

( * ) Notice: Subject to any disclaimer, the term of this patent is extended or adjusted under 35 U.S.C. 154(b) by 0 days.

(21) Appl. No.: 17/870,630

(22) Filed: Jul. 21, 2022

(65) Prior Publication Data

US 2023/0050429 A1 Feb. 16, 2023

Related U.S. Application Data

(63) Continuation of application No. 17/020,178, filed on Sep. 14, 2020, now abandoned, which is a continuation of application No. 16/891,709, filed on Jun. 3, 2020, now abandoned, which is a continuation of application No. 16/681,438, filed on Nov. 12, 2019, now abandoned, which is a continuation of application No. 16/557,668, filed on Aug. 30, 2019, (Continued)

(51) Int. Cl.
G06F 3/04847 (2022.01)
G06F 3/0481 (2022.01)
G06F 3/0482 (2013.01)
G06F 3/04842 (2022.01)
G06F 16/957 (2019.01)

(52) U.S. Cl.
CPC ........ G06F 3/04847 (2013.01); G06F 3/0481 (2013.01); G06F 3/0482 (2013.01); G06F 3/04842 (2013.01); G06F 16/9577 (2019.01)

(58) Field of Classification Search
CPC .. G06F 3/0481; G06F 3/0482; G06F 3/04842; G06F 3/04847; G06F 16/9577
See application file for complete search history.

(56) References Cited

U.S. PATENT DOCUMENTS 5,721,853 A * 2/1998 Smith ................... G06F 3/0482
715/791
6,049,336 A * 4/2000 Liu ....................... G06F 3/0482
715/830

(Continued)

Primary Examiner — Eric J. Bycer
(74) Attorney, Agent, or Firm — Cooley LLP

(57) ABSTRACT

The disclosure teaches a hierarchical multidimensional interfaces for navigating information, responsive to user feedback in the placement and appearance of navigation panes. The way a user views the contents of a menu pane is to move the mouse toward the particular menu pane. When a cursor is hovering over a pane, it may be highlighted. When the cursor is subsequently moved toward any inactive pane, a preview of that pane slides into view, showing only part of the pane. The closer the cursor gets to the pane, the larger the preview area becomes and if the user moves the mouse away from an inactive pane, its preview becomes smaller. Once the cursor crosses over to a pane different from the currently viewed, that pane slides into view. A user only need select a menu item when one wishes to navigate to a URL or application external to a navigation system.

18 Claims, 15 Drawing Sheets

Related U.S. Application Data now abandoned, which is a continuation of application No. 16/410,888, filed on May 13, 2019, now abandoned, which is a continuation of application No. 16/279,742, filed on Feb. 19, 2019, now abandoned, which is a continuation of application No. 16/168,491, filed on Oct. 23, 2018, now abandoned, which is a continuation of application No. 15/894,705, filed on Feb. 12, 2018, now abandoned, which is a continuation of application No. 14/667,192, filed on Mar. 24, 2015, now abandoned, which is a continuation of application No. 12/742,094, filed as application No. PCT/US2008/082899 on Nov. 7, 2008, now abandoned.

(60) Provisional application No. 61/044,013, filed on Apr. 10, 2008, provisional application No. 61/044,019, filed on Apr. 10, 2008, provisional application No. 60/986,561, filed on Nov. 8, 2007.

(56) References Cited

U.S. PATENT DOCUMENTS

| | | | | |
|---|---|---|---|---|
| 6,978,472 | B1 * | 12/2005 | Nashida | H04N 21/42204 348/E5.103 |
| 7,010,744 | B1 * | 3/2006 | Torgerson | G06F 3/0481 715/255 |
| 7,210,107 | B2 * | 4/2007 | Wecker | G06F 3/0482 715/834 |
| 7,246,329 | B1 * | 7/2007 | Miura | G06F 3/0481 715/764 |
| 7,956,869 | B1 * | 6/2011 | Gilra | G09G 5/14 345/157 |
| 2003/0081013 | A1 * | 5/2003 | Allen | G06F 3/0482 715/853 |
| 2005/0076312 | A1 * | 4/2005 | Gardner | G06F 3/0482 715/767 |
| 2006/0095865 | A1 * | 5/2006 | Rostom | G06F 3/0482 715/779 |
| 2006/0101353 | A1 * | 5/2006 | Clark | G06F 3/0481 715/792 |
| 2007/0256029 | A1 * | 11/2007 | Maxwell | G06F 3/0482 345/173 |
| 2008/0059913 | A1 * | 3/2008 | Burtner | G06F 3/0482 715/854 |
| 2009/0007015 | A1 * | 1/2009 | Mandic | G06F 3/0486 715/834 |
| 2011/0145753 | A1 * | 6/2011 | Prakash | G06F 3/04812 715/783 |

* cited by examiner

APPARATUSES, METHODS AND SYSTEMS FOR HIERARCHICAL MULTIDIMENSIONAL INFORMATION INTERFACES

RELATED APPLICATIONS

This Application is a Continuation of, and claims priority under 35 U.S.C. § 120 to, U.S. patent application Ser. No. 17/020,178, filed Sep. 14, 2020 and entitled "Apparatuses, Methods, and Systems for Hierarchical Multidimensional Information Interfaces," which is a Continuation of, and claims priority under 35 U.S.C. § 120 to, U.S. patent application Ser. No. 16/891,709, filed Jun. 3, 2020 and entitled "Apparatuses, Methods, and Systems for Hierarchical Multidimensional Information Interfaces," which is a Continuation of, and claims priority under 35 U.S.C. § 120 to, U.S. patent application Ser. No. 16/681,438, filed Nov. 12, 2019 and entitled "Apparatuses, Methods, and Systems for Hierarchical Multidimensional Information Interfaces," which is a Continuation of, and claims priority under 35 U.S.C. § 120 to, U.S. patent application Ser. No. 16/557,668, filed Aug. 30, 2019 and entitled "Apparatuses, Methods, and Systems for Hierarchical Multidimensional Information Interfaces," which is a Continuation of, and claims priority under 35 U.S.C. § 120 to, U.S. patent application Ser. No. 16/410,888, filed May 13, 2019 and entitled "Apparatuses, Methods and Systems for Hierarchical Multidimensional Information Interfaces," which is a Continuation of, and claims priority under 35 U.S.C. § 120 to, U.S. patent application Ser. No. 16/279,742 filed Feb. 19, 2019 and entitled "Apparatuses, Methods and Systems for Hierarchical Multidimensional Information Interfaces," which in turn is a Continuation of, and claims priority under 35 U.S.C. § 120 to, U.S. patent application Ser. No. 16/168,491 filed Oct. 23, 2018 and entitled "Apparatuses, Methods and Systems for Hierarchical Multidimensional Information Interfaces," which in turn is a Continuation of, and claims priority under 35 U.S.C. § 120 to, U.S. patent application Ser. No. 15/894,705 filed Feb. 12, 2018 and entitled "Apparatuses, Methods and Systems for Hierarchical Multidimensional Information Interfaces," which in turn is Continuation of, and claims priority under 35 U.S.C. § 120 to, U.S. patent application Ser. No. 14/667,192, filed Mar. 24, 2015 and entitled "Apparatuses, Methods and Systems for Hierarchical Multidimensional Information Interfaces," which in turn is Continuation of, and claims priority under 35 U.S.C. § 120 to, U.S. patent application Ser. No. 12/742,094, filed Feb. 14, 2011 and entitled "Apparatuses, Methods and Systems for Hierarchical Multidimensional Information Interfaces," which in turn is a National State Entry of, and claims priority under 35 U.S.C. §§ 365 and 371 to, PCT Application Serial No. PCT/US2008/082899, filed Nov. 7, 2008, and entitled "Apparatuses, Methods and Systems for Hierarchical Multidimensional Information Interfaces," which in turn claims priority under 35 U.S.C. § 119 to: U.S. Provisional Patent Application Ser. No. 60/986,561, filed Nov. 8, 2007 and entitled "Apparatuses, Methods and Systems for Hierarchical Multidimensional Information Interfaces"; U.S. Provisional Patent Application Ser. No. 61/044,013, filed Apr. 10, 2008 and entitled "Apparatuses, Methods and Systems for Portable Universal Profile"; and U.S. Provisional Patent Application Ser. No. 61/044,019, filed Apr. 10, 2008, and entitled "Apparatuses, Methods and Systems for Portable Universal Profile." The entire contents of the aforementioned applications are hereby expressly incorporated by reference. Applicants further expressly incorporate by reference the entire contents of U.S. patent application Ser. No. 11/813,671, filed Jul. 10, 2007, titled: "Apparatuses, Methods and Systems for Integrated, Information-Engineered and Self-Improving Advertising, E-Commerce and Online Customer Interactions".

FIELD

The present invention is directed generally to an apparatuses, methods, and systems for accessing and interfacing with information across a communications network, and more particularly, to APPARATUSES, METHODS AND SYSTEMS FOR HIERARCHICAL MULTIDIMENSIONAL INFORMATION INTERFACES (hereinafter "HMII").

BACKGROUND

Internet

As Internet usage increases, the amount of information available on the Internet also increases. The information that exists on the Internet is of many different types, including documents in many formats such as: computer software, databases, discussion lists, electronic journals, library catalogues, online information services, mailing lists, news groups, streaming media, and the like. Fortunately, much of the information on the Internet can be accessed through the World-Wide Web using a Web browser to interact with the network in a user-friendly way.

Network

Networks are commonly thought to consist of the interconnection and interoperation of clients, servers, and intermediary nodes in a graph topology. It should be noted that the term "server" as used herein refers generally to a computer, other device, software, and/or combination thereof that processes and responds to the requests of clients, often from across a communications network. The term "client," in turn, generally refers to a computer, other device, software, user, and/or combination thereof that generates requests for service. Generally, the term "client" and "user" are interchangeable, and are used as such throughout. As such, servers serve their information to requesting clients. A computer, other device, software, or combination thereof that facilitates, processes information and requests, and/or furthers the passage of information from a source user to a destination user is commonly referred to as a "node." Networks are generally thought to facilitate the transfer of information from source points to destinations.

World Wide Web

The proliferation and expansion of the Internet, and particularly the World Wide Web (the Web), have resulted in a vast and diverse collection of information. Various user interfaces that facilitate the interaction of users with information technology systems (i.e., people using computers) are currently in use. An information navigation interface called WorldWideWeb.app (the Web) was developed in late 1990. Subsequently, information navigation interfaces such as Web browsers have become widely available on almost every computer operating system platform.

Generally, the Web is the manifestation and result of a synergetic interoperation between user interfaces (e.g., Web browsers), servers, distributed information, protocols, and specifications. Web browsers were designed to facilitate navigation and access to information, while information servers were designed to facilitate provision of information. Typically, Web browsers and information servers are disposed in communication with one another through a communications network. Information Servers function to serve information to users that typically access the information by way of Web browsers. As such, information servers typically provide information to users employing Web browsers for navigating and accessing information on the Web. Microsoft's Internet Explorer® and Netscape Navigator® are examples of Web browsers. In addition, navigation user interface devices such as WebTV have also been implemented to facilitate Internet navigation. Many other navigation interfaces and devices also exist for navigating the Internet such as File Transmission Protocol (FTP), email interfaces (e.g., mailto:), search queries, database queries, scripts, Web Services (such as Microsoft's®.NET or Sun Microsystems' SunONE®), and the like. Some of these interfaces are intended for use by human beings, and some are intended for use directly by machines, devices, software programs, and the like. Microsoft's® Information Server and Apache® are examples of information servers.

Online Advertising

Advertising technologies have been developed in an effort to capitalize on the Internet's ability to track end user behavior in ways not possible with traditional media: e.g., with television or print magazine ads, where there is no mechanism by which to measure the end user's actual interaction, or even to verify that the end user has seen the ad at all. Companies have created "contextual ads" (such as Google's AdSense®) which "read" the content of a Web page and then place certain ads on that page in response to the page's context (e.g., Google® "Sponsored Links," which are selected and placed in a Web page in response to the particular subject-matter of the page).

SUMMARY

The described APPARATUSES, METHODS AND SYSTEMS FOR HIERARCHICAL MULTIDIMENSIONAL INFORMATION INTERFACES (hereinafter "HMII") provide interactive, responsive and efficient hierarchical multidimensional interfaces for navigating information. In one embodiment, the HMII responds to user feedback in the placement and appearance of navigation panes. For example, in first pane, a user may be provided with a preview of the next hierarchical level of panes. As the user moves the cursor (e.g., via a mouse or the like) towards the preview (e.g., the edge where the preview is shown, the preview pane or panes may expand, allowing the user to view the contents of the preview.

In one embodiment, every level of the menu is a separate pane that 'floats' on top of the other. The way a user views the contents of any menu pane is to move the mouse toward the particular menu pane. When a cursor is hovering over an item on one page, it may be highlighted. When the cursor is subsequently moved toward any inactive pane (i.e. a pane different than the one in the main view/active pane), a preview of that pane (submenu for highlighted selection) slides into view, showing only part of the pane. The closer the cursor gets to the pane, the larger the preview area gets. If the user moves the mouse in the opposite direction of an inactive pane, its preview area retracts (gets smaller). The HMII may be multidimensional, utilizing different levels as well as directional navigation elements. Once the cursor crosses over to the 'real estate' of a pane different than the currently viewed, that pane slides into view. A user may only need to click on a menu item when he or she wishes to navigate to a resource (e.g. URL, application) external to this navigation system/application.

BRIEF DESCRIPTION OF THE DRAWINGS

The accompanying drawings illustrate various non-limiting, example, inventive aspects in accordance with the present disclosure.

APPENDICES 1-4 to U.S. Provisional Patent Application Ser. No. 60/986,561, the disclosure of which is incorporated herein by reference, detail aspects of embodiments to generate APPARATUSES, METHODS AND SYSTEMS FOR HIERARCHICAL MULTIDIMENSIONAL INFORMATION INTERFACES.

DETAILED DESCRIPTION

HMII

In some embodiments of the APPARATUSES, METHODS AND SYSTEMS FOR HIERARCHICAL MULTIDIMENSIONAL INFORMATION INTERFACES (hereinafter "HMII"), the HMII uses an at least one computer to generate a hierarchical multidimensional information interface. In one embodiment, the HMII may be implemented in the context of the menus described in pending U.S. patent application Ser. No. 11/813,617, entitled APPARATUSES, METHODS AND SYSTEMS FOR INTEGRATED, INFORMATION-ENGINEERED AND SELF-IMPROVING ADVERTISING, E-COMMERCE AND ONLINE CUSTOMER INTERACTIONS, filed Jul. 10, 2007. For example, the menus illustrated in FIGS. 6, 14, 16 and/or 18 of application Ser. No. 11/813,617 may be configured to utilize the HMII, increasing ease of user navigation and exploration. Additional and alternative implementations and/or applications of the HMII may include advertising, marketing research, encouraging click-through and/or purchasing behavior, increasing navigation and/or selection efficiency, and/or the like.

Figure 1:
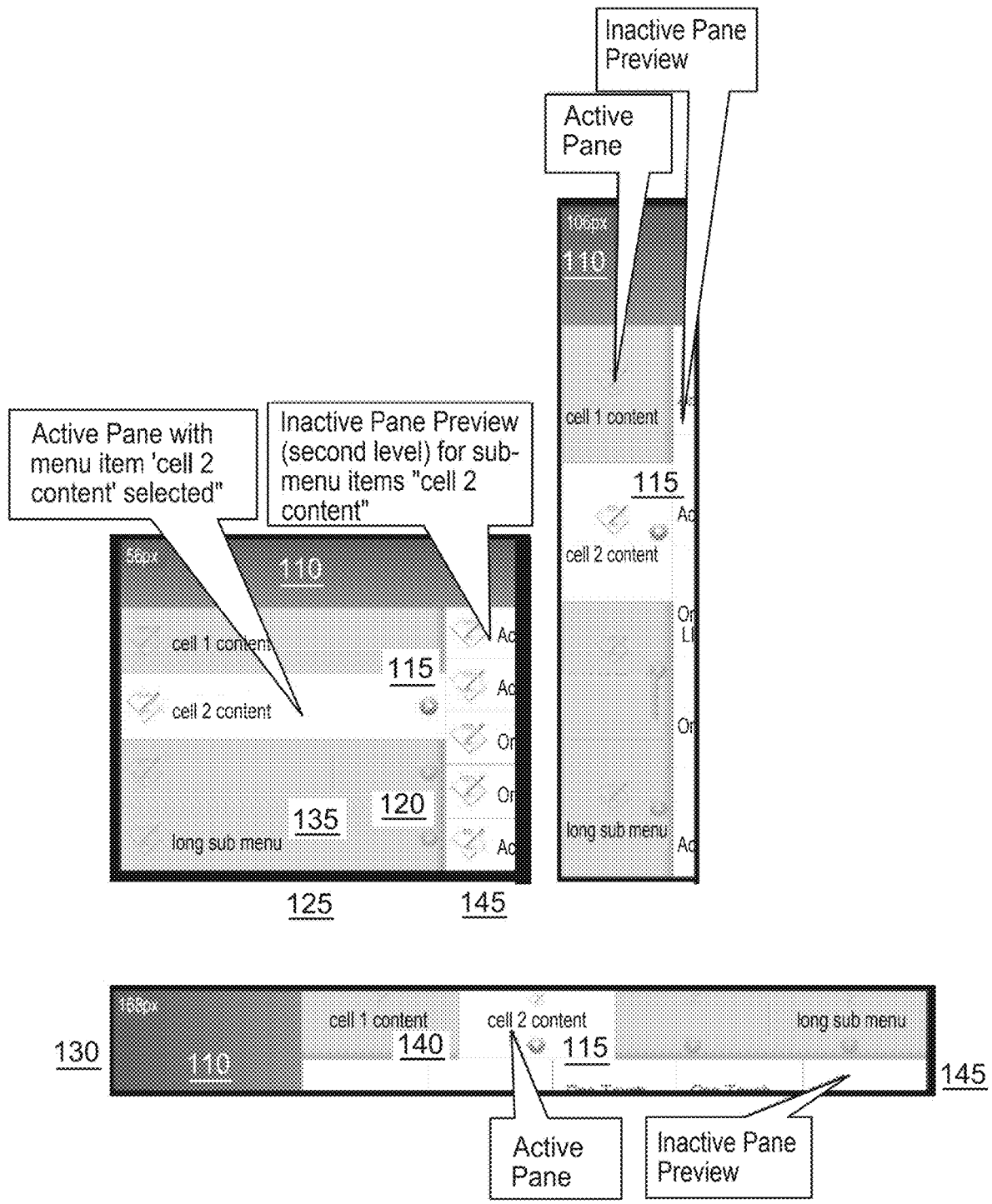
FIG. 1 of the present disclosure illustrates a block diagram with inventive aspects of a HMII.

FIG. 1 of the present disclosure illustrates inventive aspects of a HMII. In this embodiment, on can see the first level of the menu hierarchy across three different menu dimensions 110. It should be noted that the hierarchical information may be provided by way of a pointer to the menu generation object. In one embodiment, an XML paired hierarchy may include the names of menu items with paired target information (e.g., URLs, Digital Object Identifiers, file system objects, applications, next menu hierarchy heading, etc.) for each hierarchical level under a menu hierarchical heading representing each hierarchical level. Also, tab delineated lists, object hierarchies, file system hierarchies, and/or the like may be used as a data source from which menu information may be obtained and used to populate and structure the hierarchy of menus. In one embodiment, a series of linked lists may be used to represent the menu populating hierarchical information, where the links from one list to the other represent various menu hierarchy levels.

When moving the mouse pointer 120 over a menu cell, a preview of the next level of the menu hierarchy appears as the pointer moves towards the edge, i.e., it is implemented in a way that the inactive pane slides in; in this example, an arrow icon guides the user where to point the pointer 115. As can be seen in FIG. 1, the menu is agnostic as to vertical 125 and/or horizontal 130 orientation. Further, the HMII has the advantage of working within a fixed space such that all the panes fit under a single HMII menu handle see 330 of FIG. 3. In this example, the active pane is the menu column 135 (when the menu is vertically situated) or row 140 (when the menu is horizontally situated) where the pointer is currently actively engaged. The inactive pane shows the next menu level, the sub-menu level brought about by the pointer 145. In this implementation, every level of the menu is a separate pane that floats on top of the other. By moving the pointer to the next hierarchical pane, the user may then get to navigate through that pane, and again, be able to generate a further sub-pane. In one embodiment, as a user hovers the pointer over an item on one pane, the user may thereby highlight a menu item therein. Thereafter, when a user moves the pointer to a newly presented inactive pane (i.e., a pane different than the one in the main view/active pane), a preview a of the sub-pane (i.e., submenu for highlighted menu item selections) slides into view, showing only part of the pane. In this way, the closer the pointer gets to the pane, the larger the preview area becomes. If a user moves the pointer in the opposite direction of an inactive pane, its preview area retracts and thereby gets smaller. Once a pointer crosses over into the real estate of a different pane than the currently active pane, that newly selected pane slides into view. It should be noted that the user need not click any of the menu items and/or panes for such navigation, and the only time a user would want to click on a menu item is when the user wishes to navigate to a resource (e.g., a URL, application, function) external to the navigation system/application.

Figure 2:
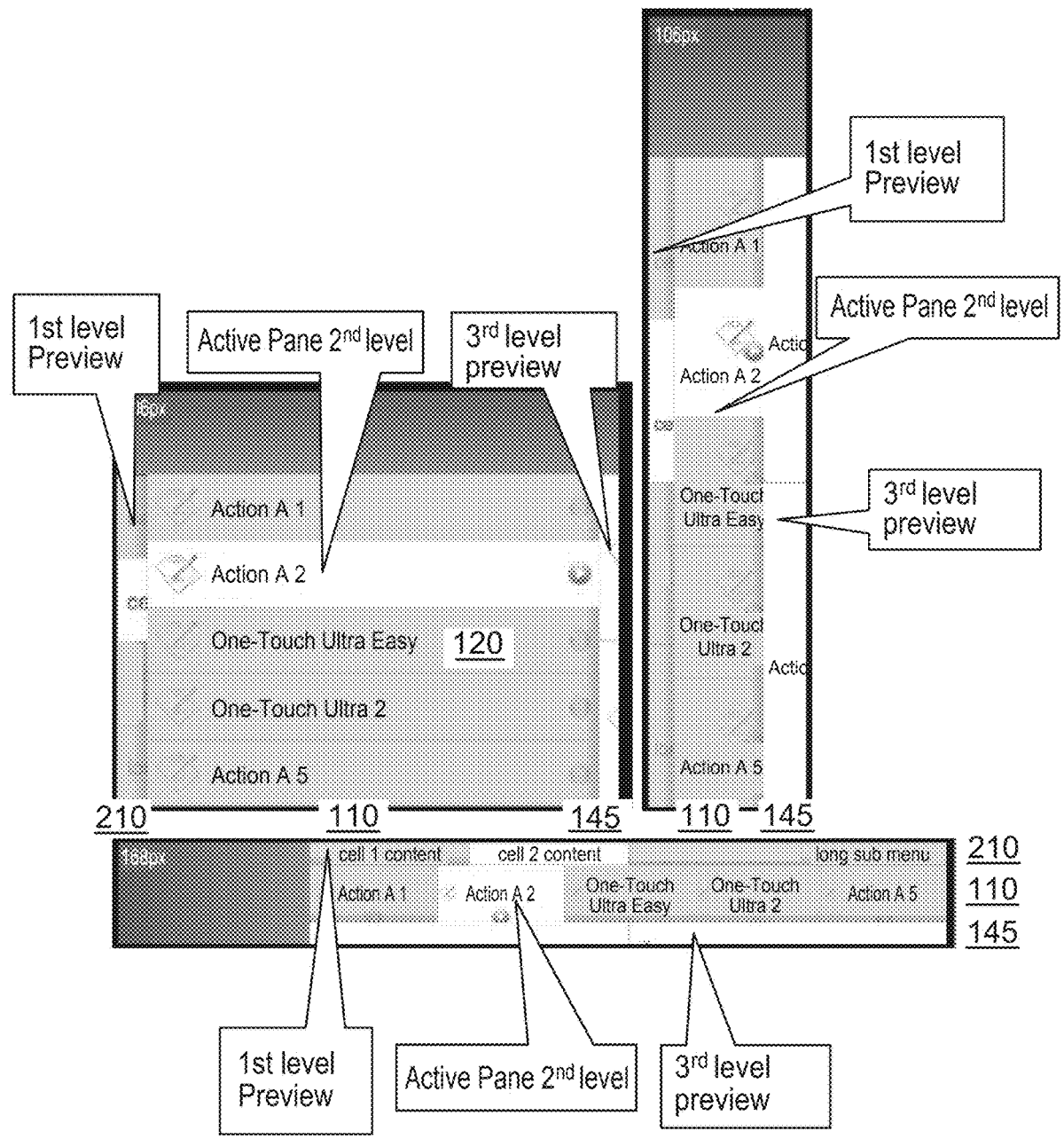
FIG. 2 of the present disclosure illustrates a block diagram of a second level of a HMII.

FIG. 2 of the present disclosure illustrates further inventive aspects of a HMII. In this figure, the 2nd hierarchical menu panel level has been made active 110, and another inactive sub-pane starts to slide into view 145 atop the active pane 110. The previously active pane, is now inactive, yet a part remains in view so as to provide navigational context 210. Again, the next preview pane 145 starts to slide into view as the pointer 120 move towards the edge of the active pane. An arrow in a cell of the active pane 110 can guide the user to where to direct the cursor 120 to the next (e.g., third level) pane 145 of the hierarchical menu associated with that cell. Should the pointer move back towards previously active pane (i.e., the first level preview) 210, it would cause the active level 110 to slightly retract as the first level preview comes more into view. Should the pointer move all the way back to the first level preview, it would cause the first level preview to become the active pane, and thus cause the active pane to fully retract and become inactive, while the first level pane would become active.

Figure 3:
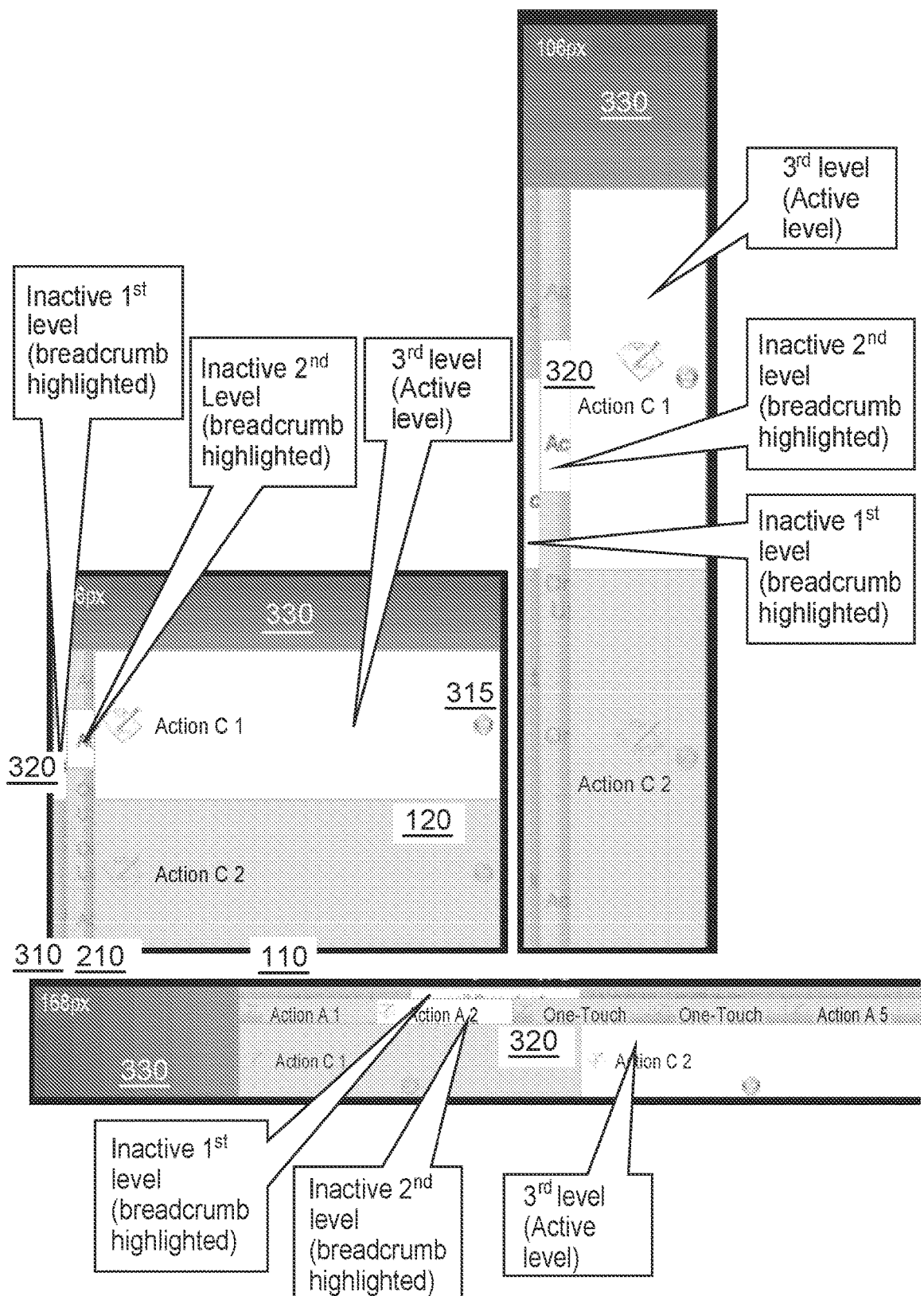
FIG. 3 of the present disclosure illustrates a block diagram of a third level of a HMII.
Figure 4A:
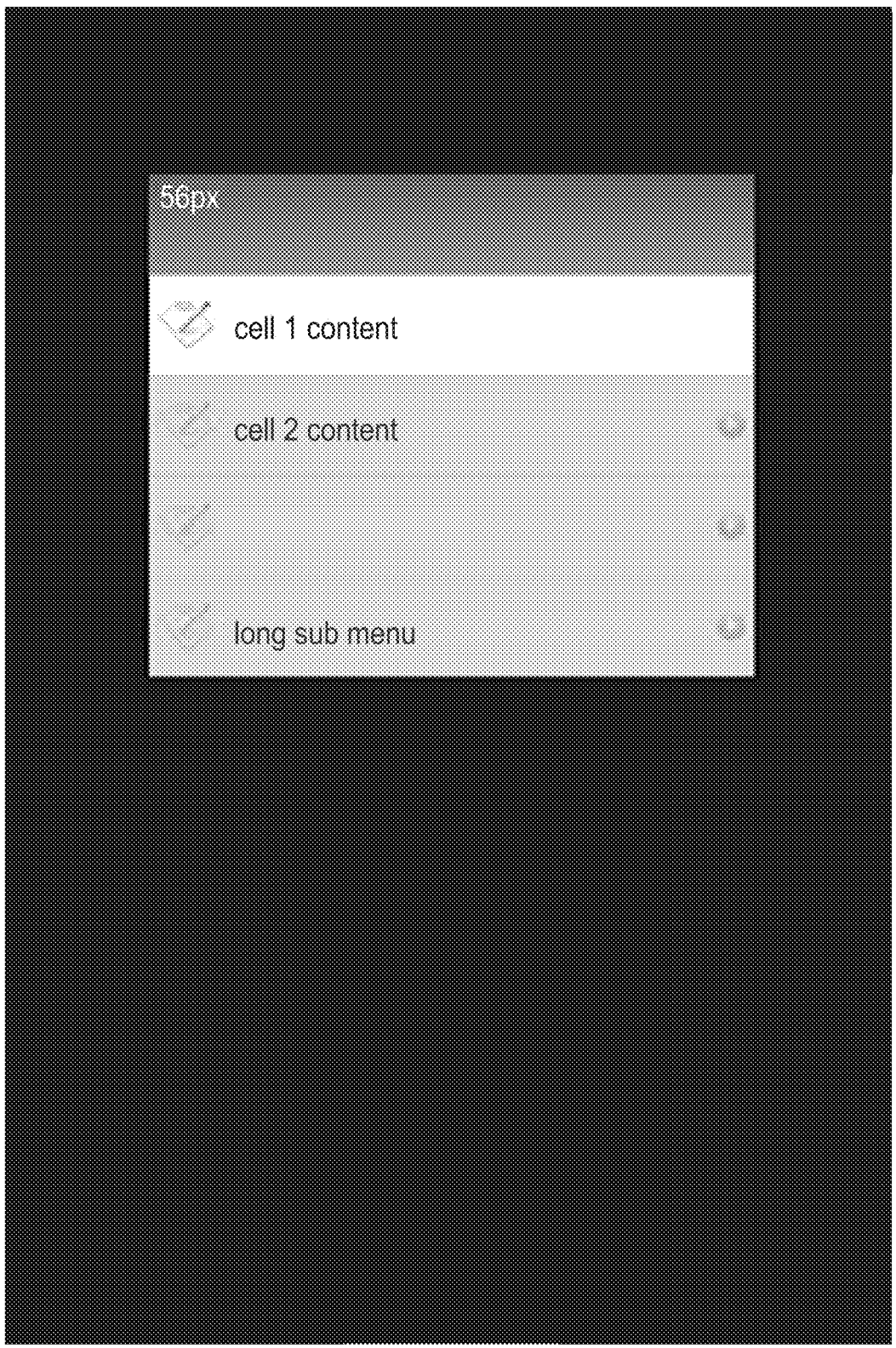
FIGS. 4A-4D illustrate an embodiment of a HMII in various states.
Figure 4B:
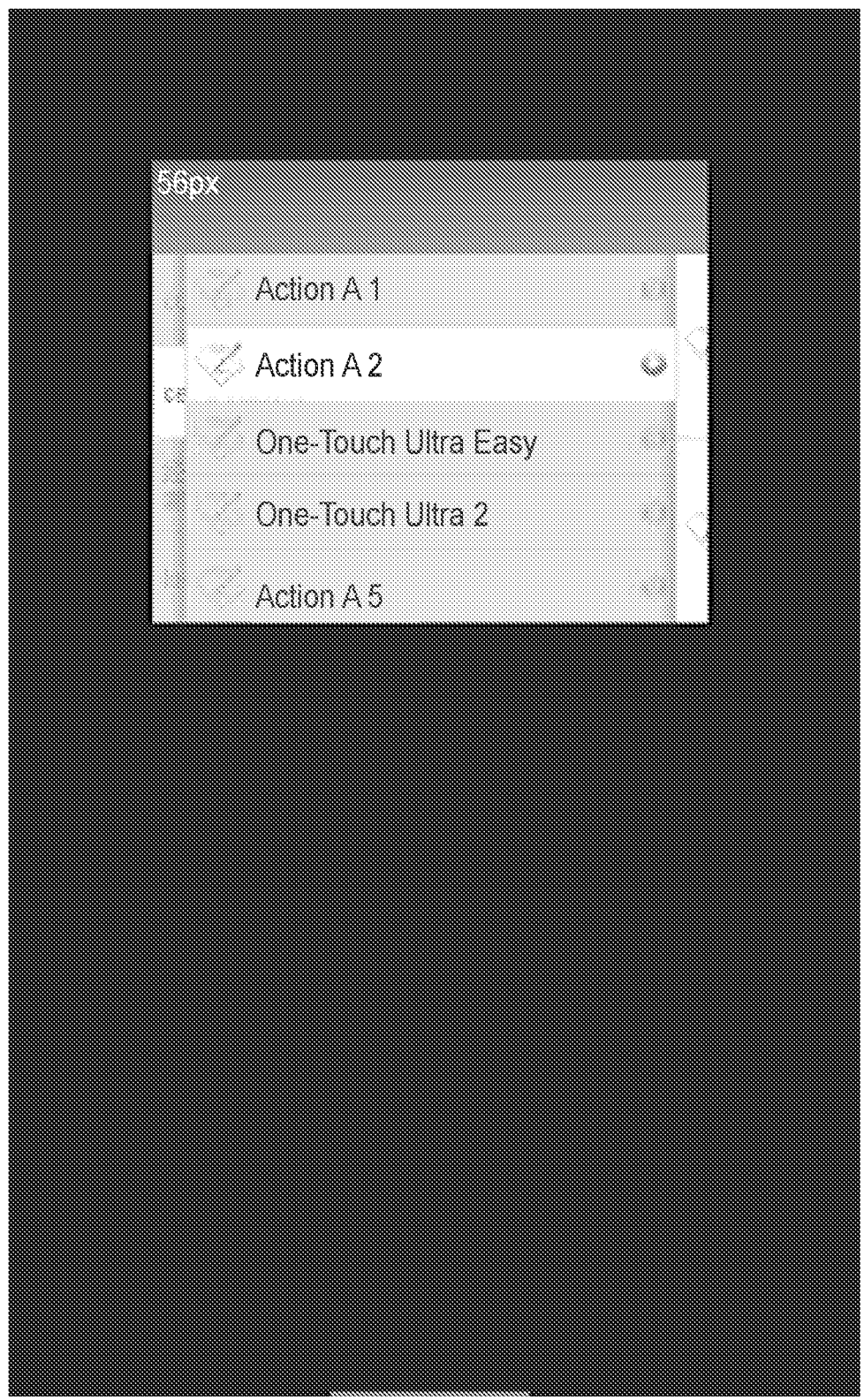
Figure 4C:
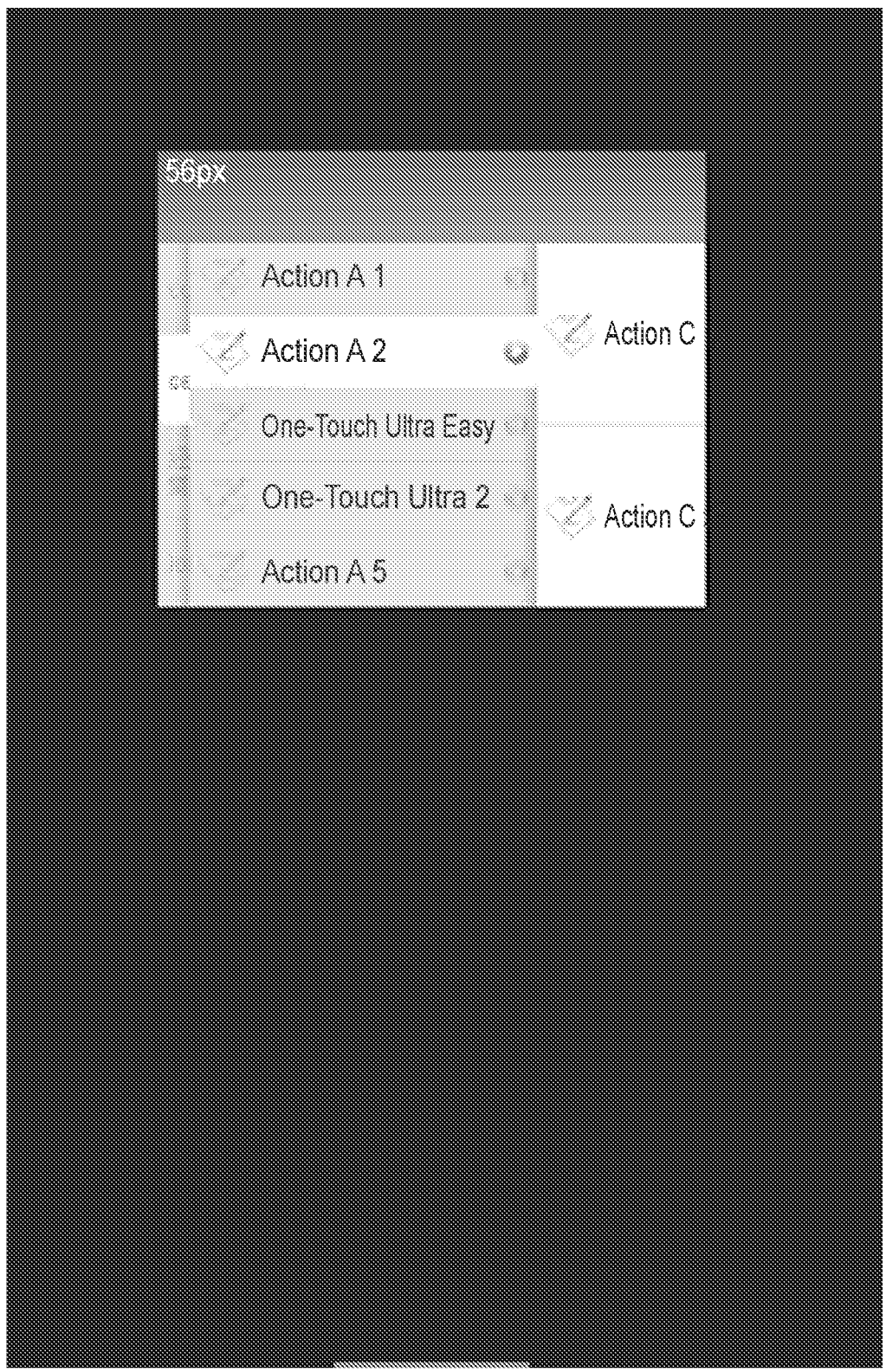
Figure 4D:
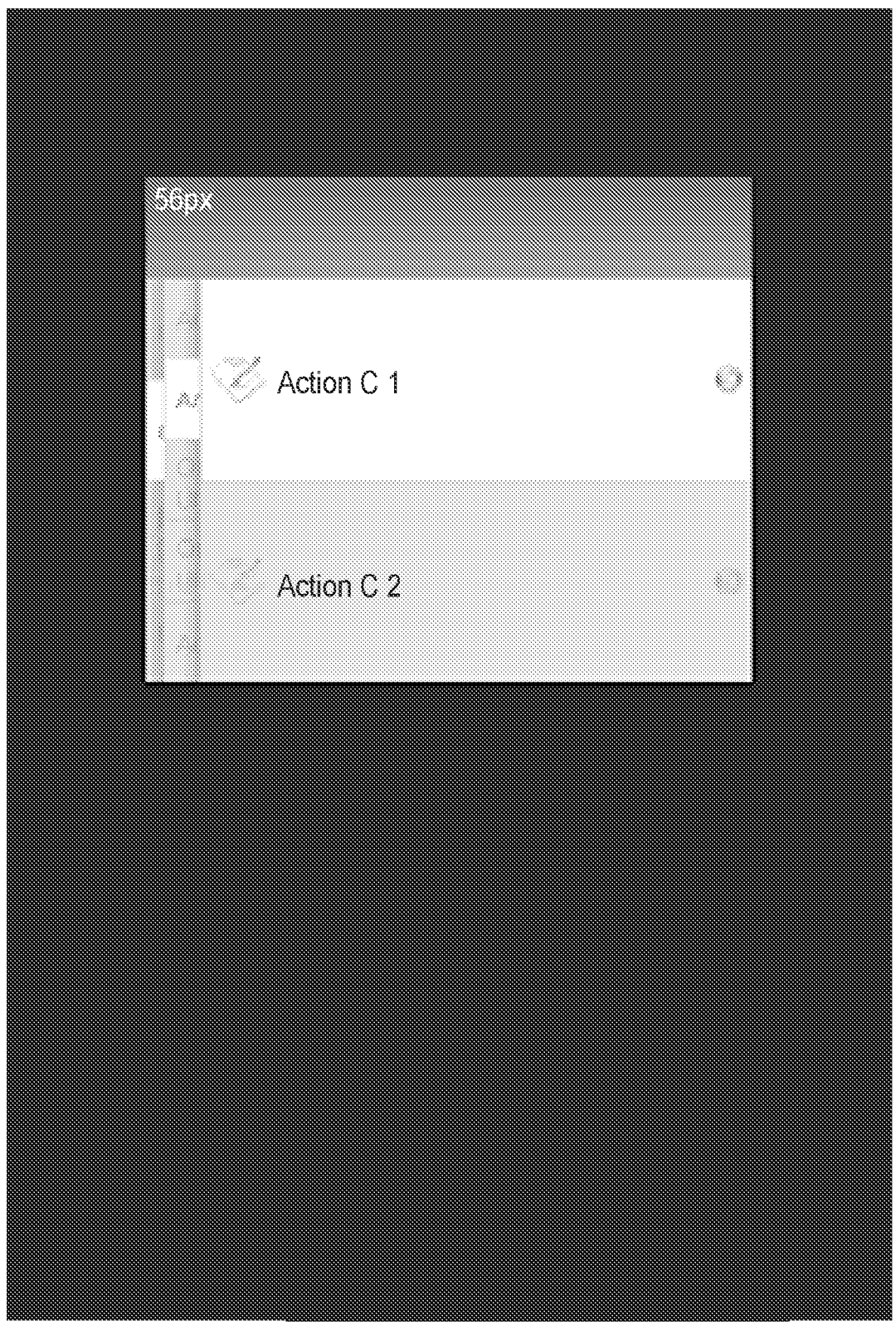

FIG. 3 of the present disclosure illustrates further inventive aspects of a HMII. In this figure, the 3rd hierarchical menu panel level has been made active 110. Here we see that the third active level pane is being selected with the pointer 120. In this example, the third active pane is a terminal pane as indicated by a blue dot 315, instead of an arrow, indicating no further sub-panes exist. It should be noted that there is no limit to the number of hierarchical menu-pane levels that may exist, i.e., 4, 5, 6 . . . and more. Here, we see a bread crumb trail 320 showing not only previous and now inactive panes 210, 310, but also the menu items that were navigated. Here, the first level menu pane 310 is tucked under the slightly more visible second level inactive pane 210, which is tucked under the fully visible active pane 110. All of which is sheathed under the menu bar handle 330.

Figure 5A:
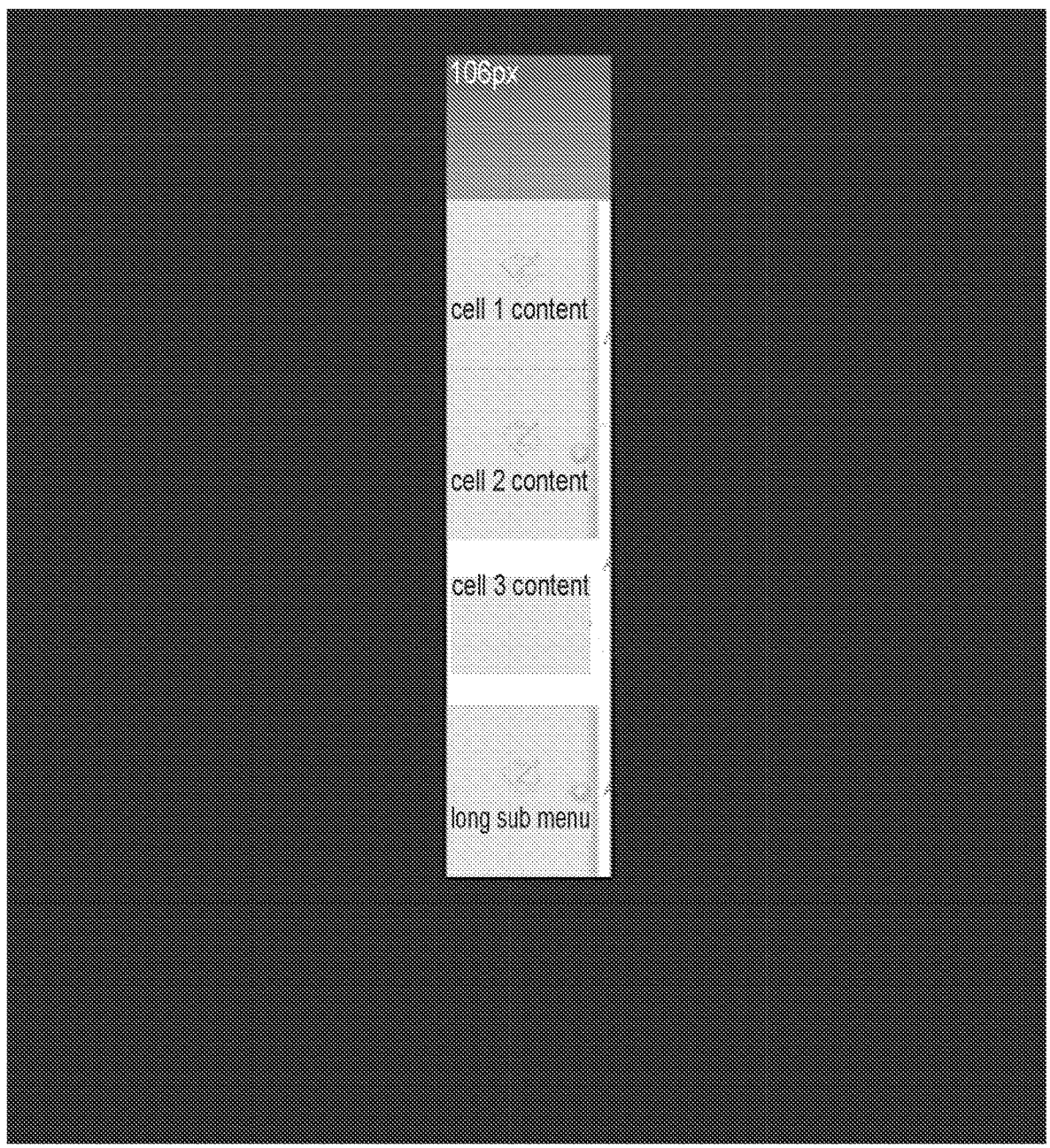
FIGS. 5A-5B of the present disclosure illustrates an embodiment of a HMII in two states.
Figure 5B:
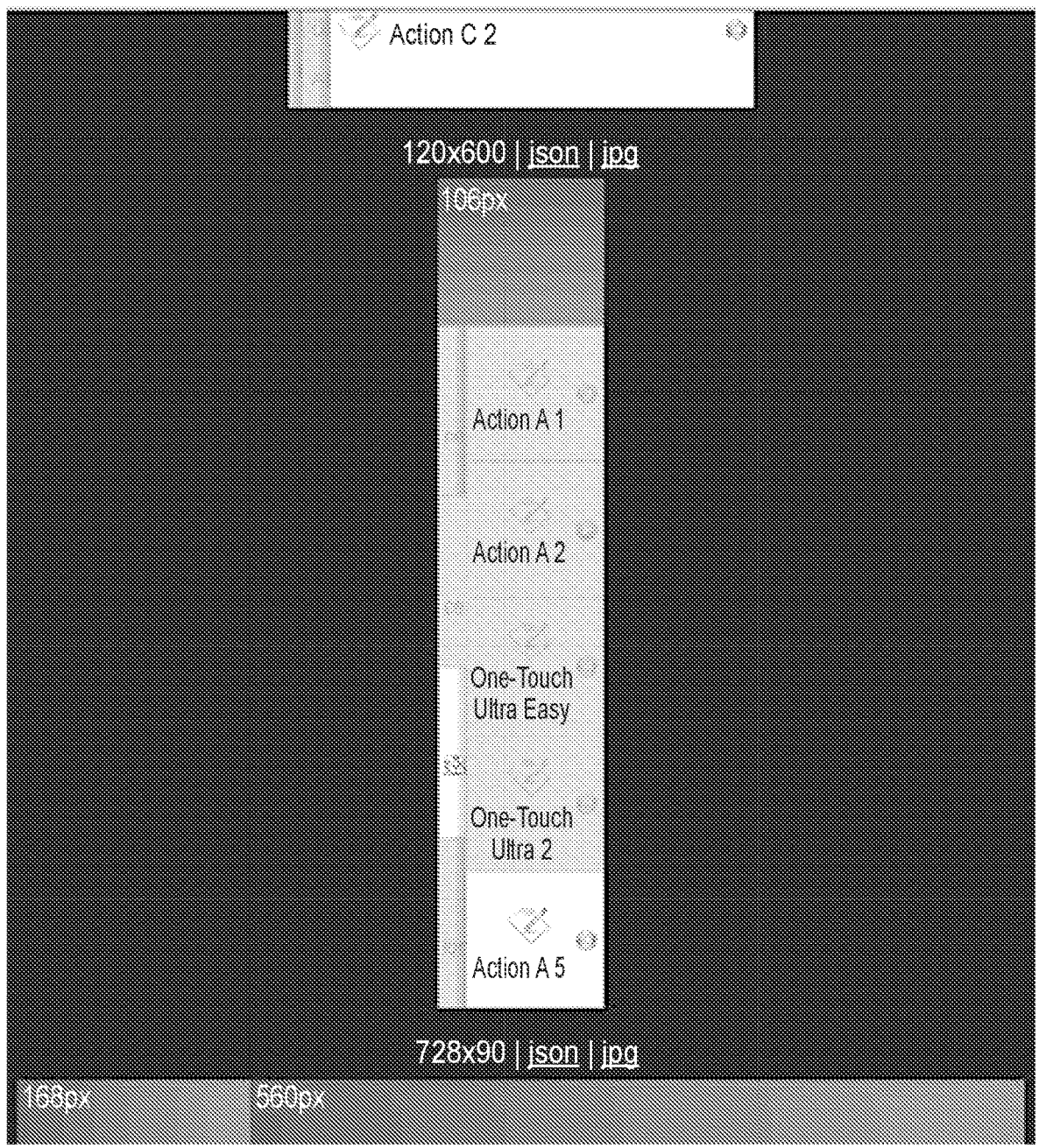
Figure 6A:
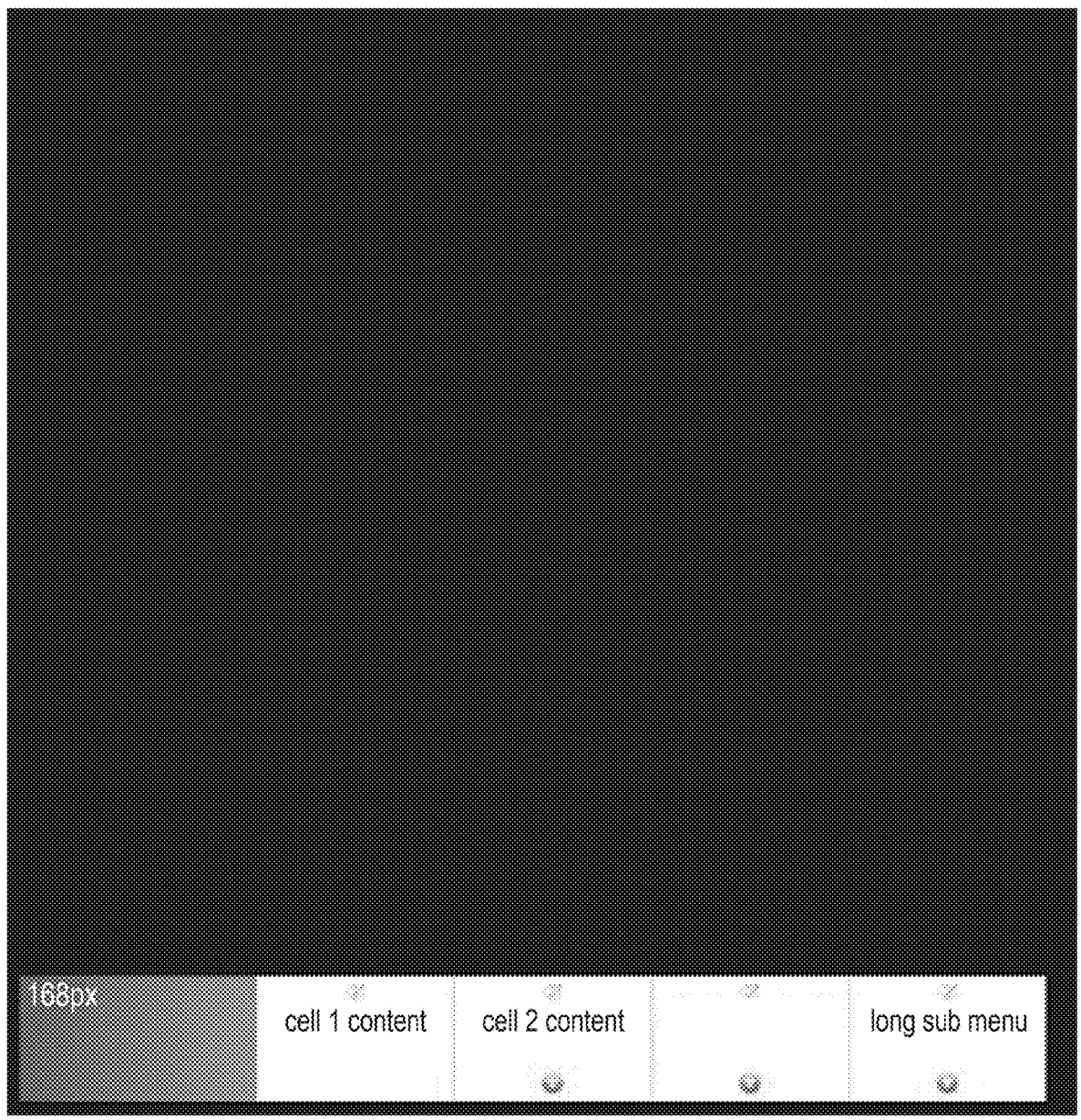
FIGS. 6A-6D of the present disclosure illustrate an embodiment of a HMII in various states.
Figure 6B:
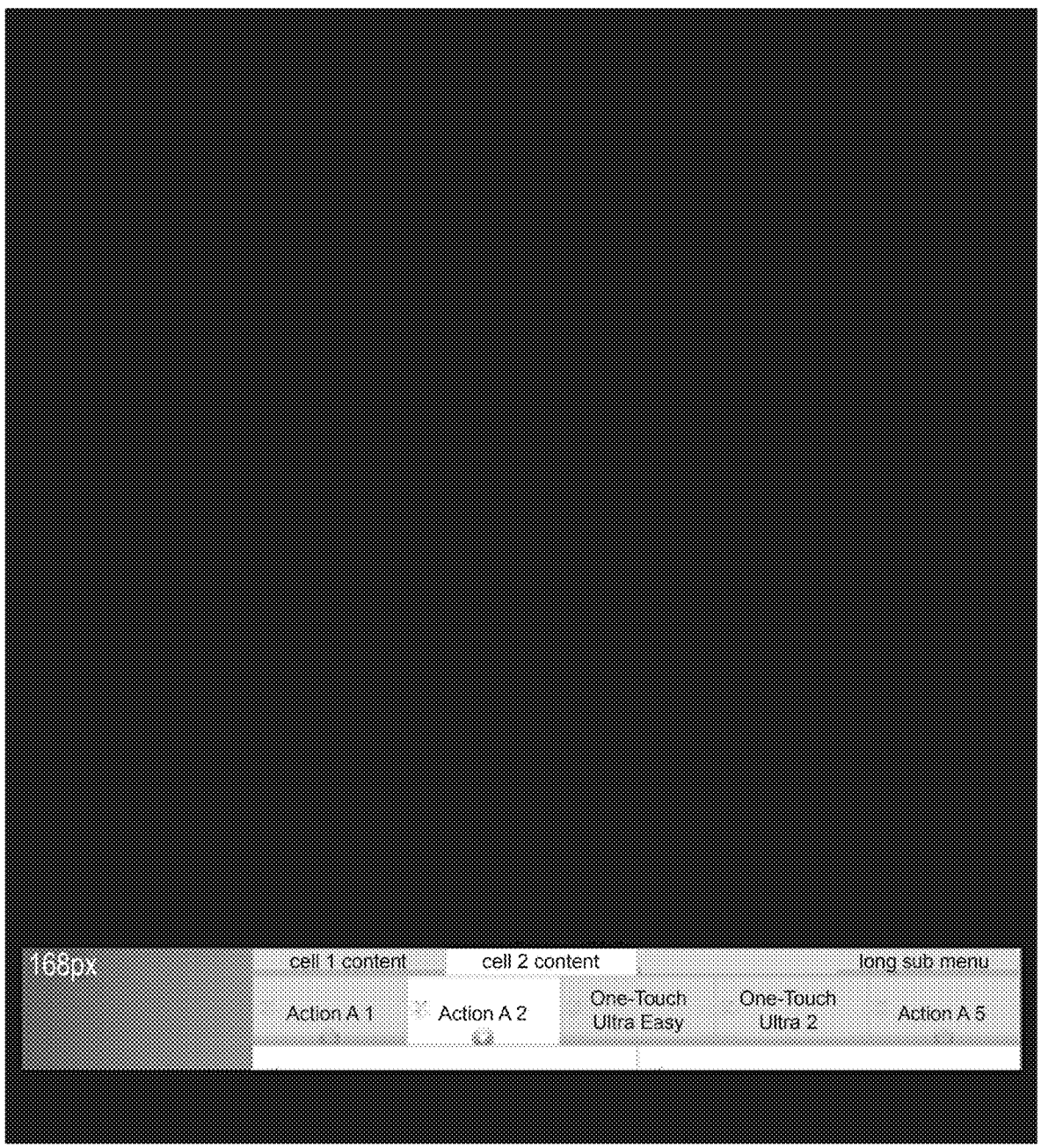
Figure 6C:
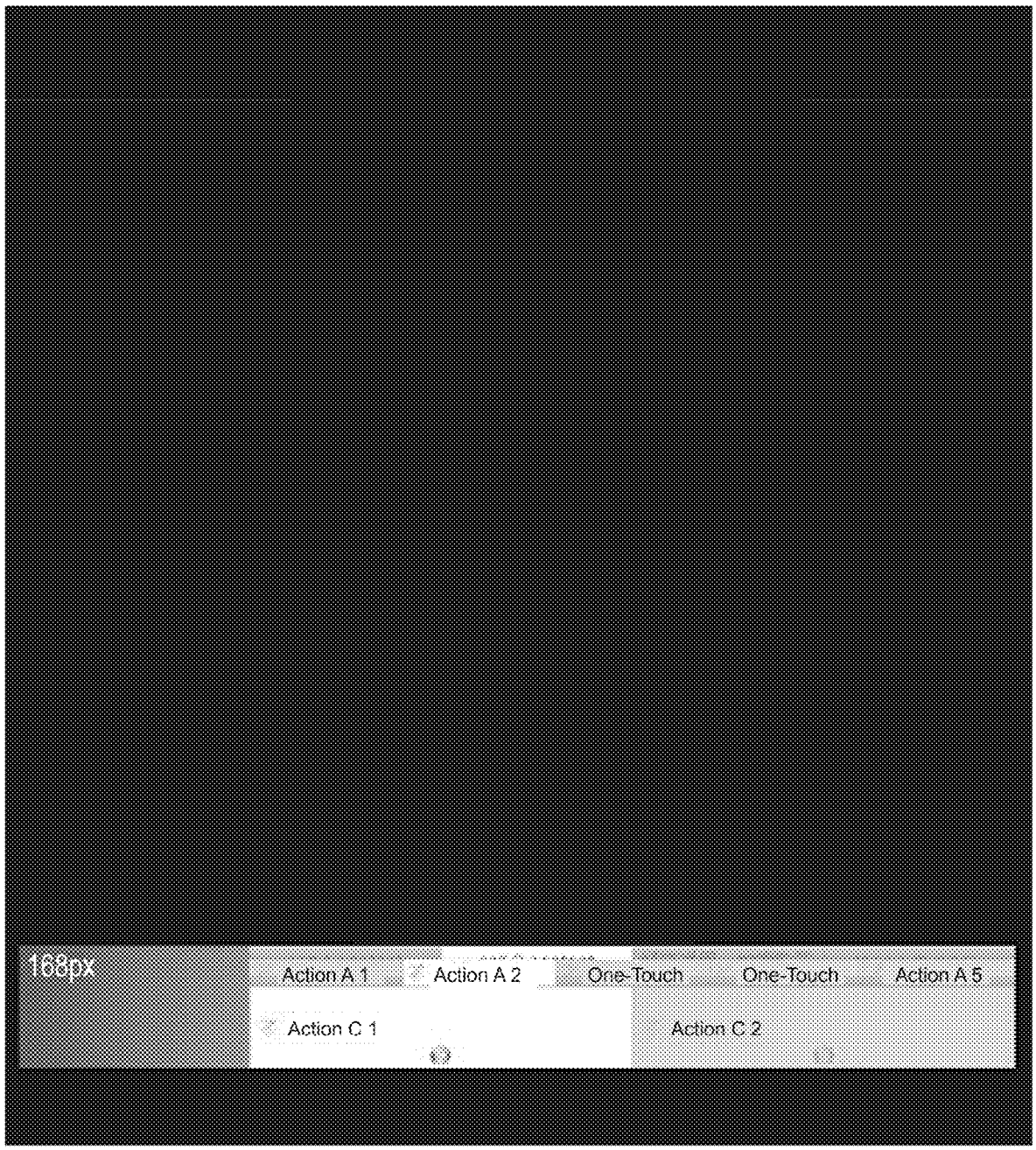
Figure 6D:
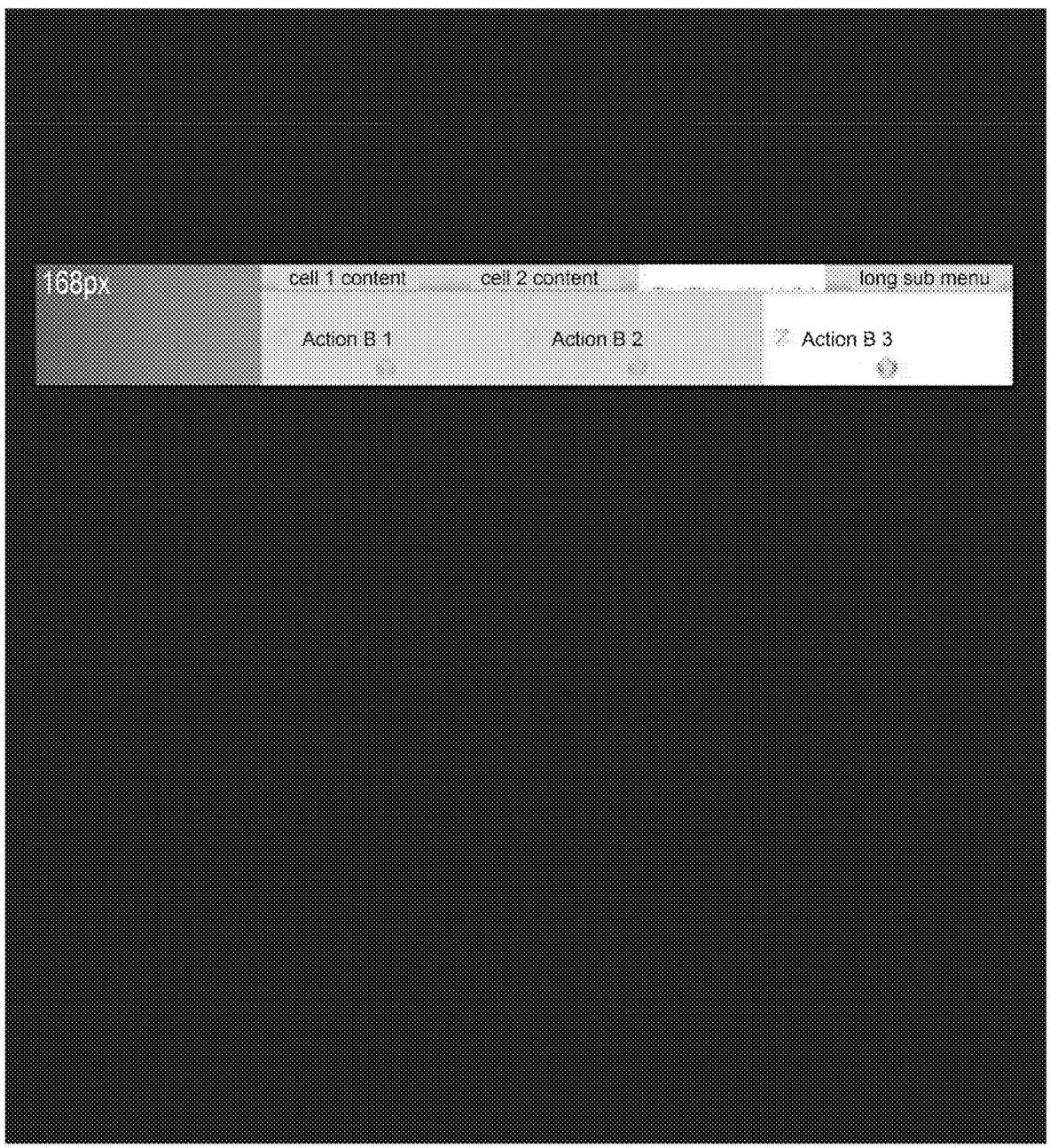

FIGS. 4A-4D illustrate an embodiment of a HMII in various states. FIGS. 5A-5B illustrate an embodiment of another embodiment of a HMII in to states. FIGS. 6A-6D illustrate yet another embodiment of a HMII in various states.

Figure 7:
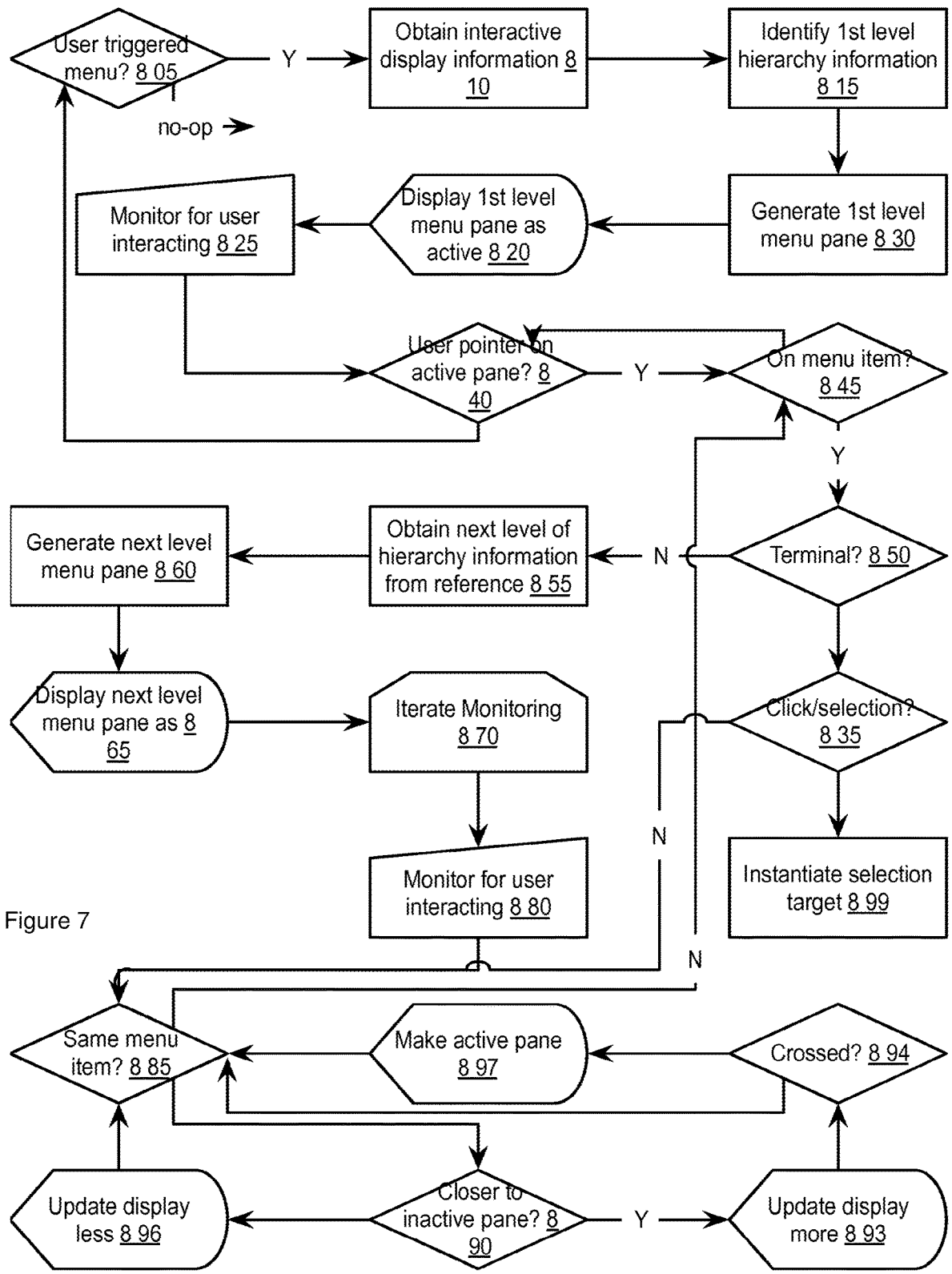
FIG. 7 of the present disclosure illustrates a logic flow diagram of a HMII.

FIG. 7 of the present disclosure illustrates a logic flow diagram of a HMII. Initially a programmatic call may be used to trigger an HMII menu 805. For example, in one embodiment, the HMII may be implemented in Javascript® and embedded in a webpage such that when a user hovers their mouse over various targets, the HMII Javascript® is executed (see Appendices 1-4 of U.S. Provisional Patent Application Ser. No. 60/986,561, which is incorporated herein by reference, for an example). It should be noted, that the HMII may be implemented in a number of languages and many operating system environments and existing user interfaces. As such, it may be included as an object library and called by applications under numerous operating system environments. For example, it may be employed under Windows®, Mac OS X®, and iPhone® operating environments. In some embodiments, it may be implemented through compiled and/or high level program development environments. In another embodiment, it may be universally deployed through a web environment deployment. Upon triggering the HMII 805, interactive display information may be provided to the HMII by way of a data structure describing a hierarchy. As has already been discussed, in one embodiment, a hierarchy may be described as an XML structure where each menu item is described and coupled with a target. Once the pointer to the data structure is obtained 810 by way of trigger 805, the HMII may discern the first level of the hierarchy in the data structure 815. In one embodiment, the hierarchical levels may be separated by level delineators such as an XML hierarchy delineator, a tab, and/or other level marker. Once the first level of information is discerned 815, the HMII may generate a graphical representation of the first menu pane level 830. The previous figures illustrated various visual depictions of the form of menu panes. In one embodiment, text representing the data structure menu information may overlay graphical elements in a window taking the form of a menu pane. In another embodiment, the HMII may employ the object menu structures of existing user interface environments such as Mac OS X's® menu hierarchy. In another embodiment, a graphical representation in Javascript® may be provided. Upon generating the first level menu pane 830, the HMII may provide the generated pane to the render engine of the display environment for display 820.

Upon displaying the menu pane 820, the HMII may continue to monitor for user input and/or selection information as the user interacts with the system 825. If the user does not move their pointer onto the active pane 840, the HMII may continue to look for other triggers 805. However, if the user moves their pointer into an active pane 840, then the HMII may determine if the user has move the pointer onto a selectable menu item 845. In one embodiment, the HMII may check the current pointer position and see if it is within the bounds of the active pane. If not, then the HMII may continue to look for interactions with the active menu pane 840. However, if so 845, then the HMII may check to see if the menu item being selected is terminal 850. If the menu item does not refer to other sub-menu information 850 (i.e., it is terminal), then the HMII may check to see if a selection has been made 835, and if so, it may instantiate the selected target 899. In one embodiment, where the target is a paired reference such as URL, DOI, application method, reference, and/or the like, the selection will trigger the execution of the target (e.g., passing the URL to the web browser for loading, execution of the program method, etc.). If no click and/or selection is made 835, the HMII may check to see if the cursor is remaining in the menu item cell 885.

If the menu item 845 is not terminal 850, then the HMII may obtain the next level of hierarchy information from the referenced data structure 855, where the reference to the next level of hierarchy information is provided as part of the paired information for the menu item 845 over which the pointer is hovering. Upon obtaining the referenced hierarchy menu information 855, the HMII may generate the next level menu pane 860. The menu pane may then be displayed as the next level inactive menu pane 865. At this point the HMII may continue 870 monitoring for user interactions with menu panes and items 880.

The HMII may then check to see if the cursor is still on the same menu item as before 885. If not 885, then the HMII may determine on which menu item the cursor is hovering 845. However, if the cursor is still on the same menu item 885, then the HMII may determine if the cursor has move closer to an inactive pane 890. If the cursor has moved away from the inactive pane 890, the display is updated such that the inactive menu pane preview is less visible relative to the active pane 896, at which point the HMII may continue to check if the cursor remains on the same menu item 885. However, if the cursor moves closer to the inactive pane 890, then the HMII updates the display such that the inactive menu pane becomes more visible relative to the active pane 893. Also, the HMII may determine if the cursor has crossed over from the same menu item 885 onto a menu item and/or area in the inactive pane 894. If the cursor has crossed over 894, then the HMII will make the inactive pane active 894 by bringing it to be the most visible menu pane and demoting other panes to become inactive and less visible 897; and then the HMII will continue to see if the cursor now remains over the newly tracked menu item 885.

In one embodiment, HMII may be used to serve ads, even within Iframes, where this embodiment allows for traversing a hierarchy within the Iframe without requiring complicated recoding the Iframe and/or without complicated modifications of the website hosting the Iframe to escape. In such an embodiment, it allows the advertiser to present a complex multi-segmented decision tree to be traversed all within a confined space on a web page. This has great advantages in compressing down what would otherwise be a long duration decision making process into something more immediate and easily convertible for the advertiser.

Hmii Controller

Figure 8:
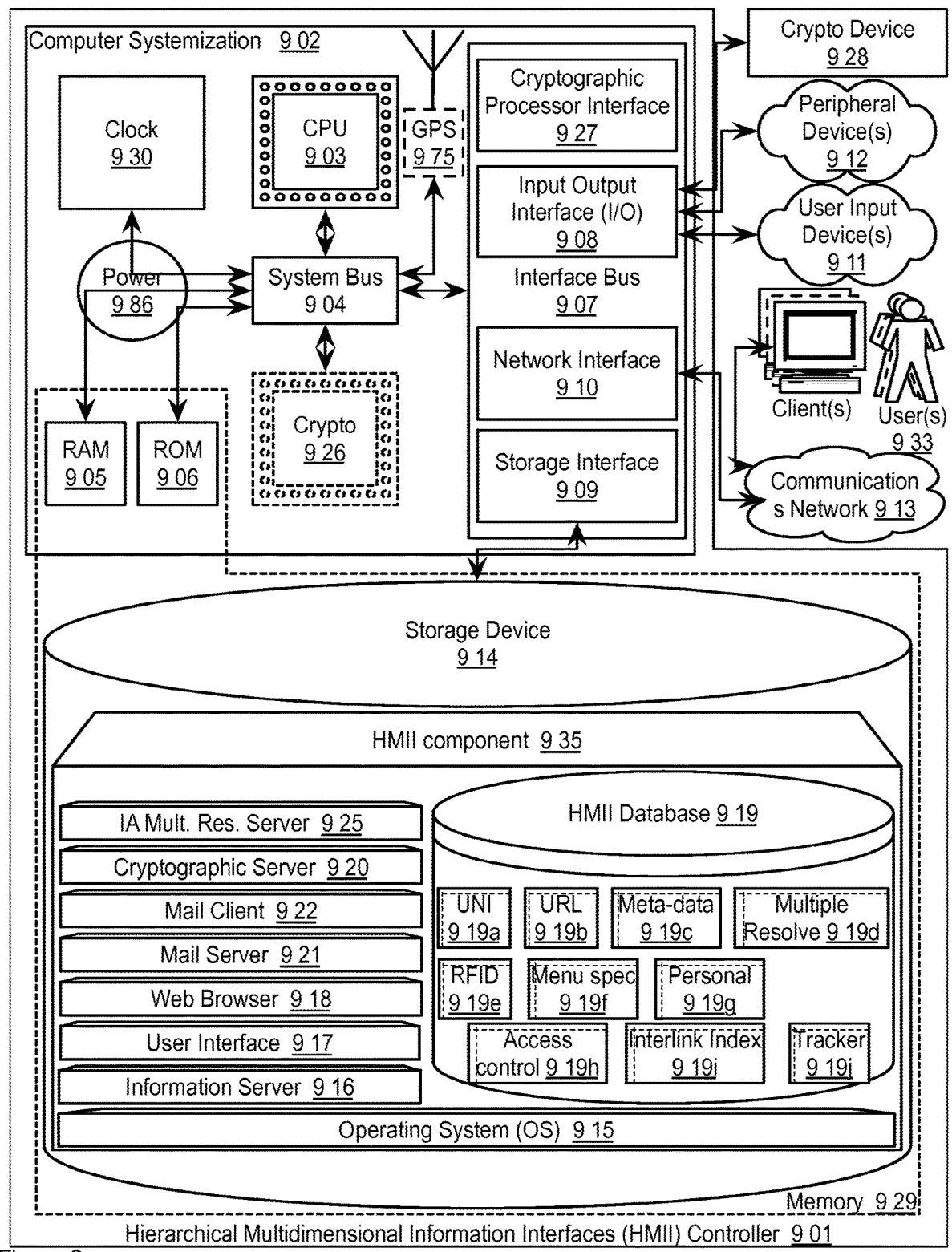
FIG. 8 is of a block diagram illustrating embodiments of the present invention of an HIERARCHICAL MULTIDIMENSIONAL INFORMATION INTERFACE controller.

FIG. 8 of the present disclosure illustrates inventive aspects of a HMII controller 901 in a block diagram. In this embodiment, the HMII controller 901 may serve to aggregate, process, store, search, serve, identify, instruct, generate, match, facilitate, add, edit, provide and/or update interface and/or other related data.

Typically, users, which may be people and/or other systems, engage information technology systems (e.g., commonly computers) to facilitate information processing. In turn, computers employ processors to process information; such processors are often referred to as central processing units (CPU). A common form of processor is referred to as a microprocessor. CPUs use communicative signals to enable various operations. Such communicative signals may be stored and/or transmitted in batches as program and/or data components facilitate desired operations. These stored instruction code signals may engage the CPU circuit components to perform desired operations. A common type of program is a computer operating system, which, commonly, is executed by CPU on a computer; the operating system enables and facilitates users to access and operate computer information technology and resources. Common resources employed in information technology systems include: input and output mechanisms through which data may pass into and out of a computer; memory storage into which data may be saved; and processors by which information may be processed. Often information technology systems are used to collect data for later retrieval, analysis, and manipulation, commonly, which is facilitated through a database program. Information technology systems provide interfaces that allow users to access and operate various system components.

In one embodiment, the HMII controller 901 may be connected to and/or communicate with entities such as, but not limited to: one or more users from user input devices 911; peripheral devices 912; a cryptographic processor device 928; and/or a communications network 913.

Networks are commonly thought to comprise the interconnection and interoperation of clients, servers, and intermediary nodes in a graph topology. It should be noted that the term "server" as used throughout this disclosure refers generally to a computer, other device, program, or combination thereof that processes and responds to the requests of remote users across a communications network. Servers serve their information to requesting "clients." The term "client" as used herein refers generally to a computer, other device, program, or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The HMII controller 901 may be based on common computer systems that may comprise, but are not limited to, components such as: a computer systemization 902 connected to memory 929.

Computer Systemization

A computer systemization 902 may comprise a clock 930, central processing unit (CPU) 903, a read only memory (ROM) 906, a random access memory (RAM) 905, and/or an interface bus 907, and most frequently, although not necessarily, are all interconnected and/or communicating through a system bus 904. Optionally, the computer systemization may be connected to an internal power source 986. Optionally, a cryptographic processor 926 may be connected to the system bus. The system clock typically has a crystal oscillator and provides a base signal. The clock is typically coupled to the system bus and various clock multipliers that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU may be a microprocessor such as AMD's Athlon®, Duron® and/or Opteron®; IBM® and/or Motorola's PowerPC®; IBM's and Sony's Cell® processor; Intel's Celeron®, Itanium®, Pentium®, Xeon®, and/or XScale®; and/or the like processor(s). The CPU interacts with memory through signal passing through conductive conduits to execute stored signal program code according to conventional data processing techniques. Such signal passing facilitates communication within the HMII controller and beyond through various interfaces. Should processing requirements dictate a greater amount speed, parallel, mainframe and/or super-computer architectures may similarly be employed. Alternatively, should deployment requirements dictate greater portability, smaller Personal Digital Assistants (PDAs) may be employed.

Power Source

The power source 986 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 986 is connected to at least one of the interconnected subsequent components of the HMII thereby providing an electric current to all subsequent components. In one example, the power source 986 is connected to the system bus component 904. In an alternative embodiment, an outside power source 986 is provided through a connection across the I/O 908 interface. For example, a USB and/or IEEE 1394 connection carries both data and power across the connection and is therefore a suitable source of power.

Interface Adapters

Interface bus (ses) 907 may accept, connect, and/or communicate to a number of interface adapters, conventionally although not necessarily in the form of adapter cards, such as but not limited to: input output interfaces (I/O) 908, storage interfaces 909, network interfaces 910, and/or the like. Optionally, cryptographic processor interfaces 927 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)™), PCI Express™, Personal Computer Memory Card International Association (PCMCIA), and/or the like.

Storage interfaces 909 may accept, communicate, and/or connect to a number of storage devices such as, but not limited to: storage devices 914, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 910 may accept, communicate, and/or connect to a communications network 913. Through a communications network 113, the HMII controller is accessible through remote clients 933b (e.g., computers with web browsers) by users 933a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 910 may be used to engage with various communications network types 913. For example, multiple network interfaces may be employed to allow for the communication over broadcast, multicast, and/or unicast networks.

Input Output interfaces (I/O) 908 may accept, communicate, and/or connect to user input devices 911, peripheral devices 912, cryptographic processor devices 928, and/or the like. I/O may employ connection protocols such as, but not limited to: Apple® Desktop Bus (ADB); Apple® Desktop Connector (ADC); audio: analog, digital, monaural, RCA, stereo, and/or the like; IEEE 1394a-b; infrared; joystick; keyboard; midi; optical; PC AT; PS/2; parallel; radio; serial; USB; video interface: BNC, coaxial, composite, digital, Digital Visual Interface (DVI), RCA, RF antennae, S-Video, VGA, and/or the like; wireless; and/or the like. A common output device is a television set 145, which accepts signals from a video interface. Also, a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Typically, the video interface provides the composited video information through a video connection interface that accepts a video display interface (e.g., an RCA composite video connector accepting an RCA composite video cable; a DVI connector accepting a DVI display cable, etc.).

User input devices 911 may be card readers, dongles, finger print readers, gloves, graphics tablets, joysticks, keyboards, mouse (mice), remote controls, retina readers, trackballs, trackpads, and/or the like.

Peripheral devices 912 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the HMII controller may be embodied as an embedded, dedicated, and/or monitor-less (i.e., headless) device, wherein access would be provided over a network interface connection.

Cryptographic units such as, but not limited to, microcontrollers, processors 926, interfaces 927, and/or devices 928 may be attached, and/or communicate with the HMII controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA® private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 184.

Memory

Generally, any mechanization and/or embodiment allowing a processor to affect the storage and/or retrieval of information is regarded as memory 929. However, memory is a fungible technology and resource, thus, any number of memory embodiments may be employed in lieu of or in concert with one another. It is to be understood that the HMII controller and/or a computer systemization may employ various forms of memory 929. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 929 will include ROM 906, RANI 905, and a storage device 914. A storage device 914 may be any conventional computer system storage. Storage devices may include a drum; a (fixed and/or removable) magnetic disk drive; a magneto-optical drive; an optical drive (i.e., CD ROM/RANI/Recordable (R), ReWritable (RW), DVD R/RW, etc.); an array of devices (e.g., Redundant Array of Independent Disks (RAID)); and/or other devices of the like. Thus, a computer systemization generally requires and makes use of memory.

Component Collection

The memory 929 may contain a collection of program and/or database components and/or data such as, but not limited to: operating system component(s) 915 (operating system); information server component(s) 916 (information server); user interface component(s) 917 (user interface); Web browser component(s) 918 (Web browser); database(s) 919; mail server component(s) 921; mail client component(s) 922; cryptographic server component(s) 920 (cryptographic server); the HMII component(s) 935; and/or the like (i.e., collectively a component collection). These components may be stored and accessed from the storage devices and/or from storage devices accessible through an interface bus. Although non-conventional program components such as those in the component collection, typically, are stored in a local storage device 914, they may also be loaded and/or stored in memory such as: peripheral devices, RAM, remote storage facilities through a communications network, ROM, various forms of memory, and/or the like.

Operating System

The operating system component 915 is an executable program component facilitating the operation of the HMII controller. Typically, the operating system facilitates access of 1/0, network interfaces, peripheral devices, storage devices, and/or the like. The operating system may be a highly fault tolerant, scalable, and secure system such as: Apple Macintosh OS X® (Server); AT&T Plan 9®; Be OS®; Unix® and Unix®-like system distributions (such as AT&T's UNIX®; Berkley Software Distribution (BSD®) variations such as FreeBSD®, NetBSD®, OpenBSD, and/or the like; Linux® distributions such as Red Hat®, Ubuntu®, and/or the like); and/or the like operating systems. However, more limited and/or less secure operating systems also may be employed such as Apple Macintosh OS®, IBM OS/2®, Microsoft® DOS, Microsoft Windows 2000/2003/3.1/95/98/CE/Millenium/NT/Vista/XP (Server)®, Palm OS®, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the HMII controller to communicate with other entities through a communications network 913. Various communication protocols may be used by the HMII controller as a subcarrier transport mechanism for interaction, such as, but not limited to: multicast, TCP/IP, UDP, unicast, and/or the like.

Information Server

An information server component 916 is a stored program component that is executed by a CPU. The information server may be a conventional Internet information server such as, but not limited to Apache Software Foundation's Apache®, Microsoft's® Internet Information Server, and/or the. The information server may allow for the execution of program components through facilities such as Active Server Page (ASP), ActiveX®, (ANSI) (Objective-) C (++), C#and/or.NET, Common Gateway Interface (CGI) scripts, Java®, JavaScript®, Practical Extraction Report Language (PERL), Hypertext Pre-Processor (PHP), pipes, Python®, WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM)®, Application Exchange (APEX), ICQ, Internet Relay Chat (IRC), Microsoft Network (MSN)® Messenger Service, Presence and Instant Messaging Protocol (PRIM), Internet Engineering Task Force's (IETF's®) Session Initiation Protocol (SIP), SIP for Instant Messaging and Presence Leveraging Extensions (SIMPLE), open XML-based Extensible Messaging and Presence Protocol (XMPP) (i.e., Jabber® or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the HMII controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the HMII database 919, operating systems, other program components, user interfaces, Web browsers, and/or the like.

Access to the HMII database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the HMII. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the HMII as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua®, IBM's OS/2®, Microsoft's Windows 2000/2003/3.1/95/98/CE/Millenium/ NT/Vista (i.e., Aero)/XP®, or Unix's X-Windows® (e.g., which may include additional Unix® graphic interface libraries and layers such as K Desktop Environment (KDE)®, mythTV® and GNU Network Object Model Environment (GNOME)®), provide a baseline and means of accessing and displaying information graphically to users.

A user interface component 917 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 918 is a stored program component that is executed by a CPU. The Web browser may be a conventional hypertext viewing application such as Microsoft Internet Explorer® or Netscape Navigator®. Secure Web browsing may be supplied with 128 bit (or greater) encryption by way of HTTPS, SSL, and/or the like. Some Web browsers allow for the execution of program components through facilities such as Java®, JavaScript®, ActiveX, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the HMII enabled nodes. The combined application may be nugatory on systems employing standard Web browsers.

Mail Server

A mail server component 921 is a stored program component that is executed by a CPU 903. The mail server may be a conventional Internet mail server such as, but not limited to sendmail, Microsoft® Exchange, and/or the. The mail server may allow for the execution of program components through facilities such as ASP, ActiveX, (ANSI) (Objective-) C (++), C#and/or.NET, CGI scripts, Java®, JavaScript®, PERL, PHP, pipes, Python®, WebObjects, and/or the like. The mail server may support communications protocols such as, but not limited to: Internet message access protocol (IMAP), Messaging Application Programming Interface (MAPI)/Microsoft® Exchange, post office protocol (POP3), simple mail transfer protocol (SMTP), and/or the like. The mail server can route, forward, and process incoming and outgoing mail messages that have been sent, relayed and/or otherwise traversing through and/or to the HMII.

Access to the HMII mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 922 is a stored program component that is executed by a CPU 903. The mail client may be a conventional mail viewing application such as Apple Mail, Microsoft® Entourage, Microsoft Outlook®, Microsoft Outlook Express®, Mozilla, Thunderbird®, and/or the like. Mail clients may support a number of transfer protocols, such as: IMAP, Microsoft® Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 920 is a stored program component that is executed by a CPU 903, cryptographic processor 926, cryptographic processor interface 927, cryptographic processor device 928, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA® (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the HMII may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the HMII component to engage in secure transactions if so desired. The cryptographic component facilitates the secure accessing of resources on the HMII and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The HMII Database

The HMII database component 919 may be embodied in a database and its stored data. The database is a stored program component, which is executed by the CPU; the stored program component portion configuring the CPU to process the stored data. The database may be a conventional, fault tolerant, relational, scalable, secure database such as Oracle® or Sybase®. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the HMII database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the HMII database is implemented as a data-structure, the use of the HMII database 919 may be integrated into another component such as the HMII component 935. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 919 includes several tables 919*a-i*, which are representative of the schema, tables, structures, keys, entities and relationships of the described database. A UNI (e.g., Handle, DOI and/or other UNIs) table 919a includes fields such as, but not limited to: DOI, creator name, creator contact information, registration agency, and/or the like. An URL table 919b includes fields such as, but not limited to: DOI, multiple resolution identifier, URL, and/or the like. A metadata table 919c includes fields such as, but not limited to: DOI, multiple resolution identifier, URL, menu specification, custom field 1, custom field 2, etc., and/or the like. A multiple resolution table 919d includes fields such as, but not limited to: DOI, metadata, and/or the like. A RFID table 919e includes fields such as, but not limited to: RFID number, DOI, multiple resolution identifier, GPS coordinates, transaction number, and/or the like. A menu specification table 919f includes fields such as, but not limited to: DOI, metadata, multiple resolution identifier, viewable entry, MultiLink menu specification, menu label, and/or the like. An personal (DOI information) table 919g includes fields such as, but not limited to: DOI, multiple resolution identifier, telephone number, Voice over IP ID (e.g., the ID user name and password), instant messenger ID (e.g., the ID user name and password), email, metadata, and/or the like. A access control table 919h includes fields such as, but not limited to: DOI, metadata, multiple resolution identifier, owner, users, control setting, and/or the like. An interlink index table 919i includes fields such as, but not limited to: DOI, metadata, multiple resolution identifier, sponsored link status, number of matched links, number of missing links, number of unknown links, popularity ranking, and/or the like. A tracker table 919j includes fields such as, but not limited to: IP address, DOI, multiple resolution identifier, number of times menu item is selected, amount of time menu item is considered, number of time menu item is passed over, and/or the like. All the tables may be related by (enhanced) DOI key field entries as they are unique.

In one embodiment, the HMII database may interact with other database systems. For example, employing a distributed database system, queries and data access by search HMII component may treat the combination of the HMII database, an integrated data security layer database as a single database entity.

In one embodiment, user programs may contain various user interface primitives, which may serve to update the HMII. Also, various accounts may require custom database tables depending upon the environments and the types of clients the HMII may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 919a-e. The HMII may be configured to keep track of various settings, inputs, and parameters via database controllers.

The HMII database may communicate to and/or with other components in a component collection, including itself, and/or facilities of the like. Most frequently, the HMII database communicates with the HMII component, other program components, and/or the like. The database may contain, retain, and provide information regarding other nodes and data.

The HMIIs

The HMII component 935 is a stored program component that is executed by a CPU. In one embodiment, the HMII component incorporates any and/or all combinations of the aspects of the HMII that was discussed in the previous figures. As such, the HMII affects accessing, obtaining and the provision of information, services, transactions, and/or the like across various communications networks.

A HMII database may communicate to and/or with other components in a component collection, including itself, and/or facilities of the like. Most frequently, the HMII database communicates with a HMII component, other program components, and/or the like. The database may contain, retain, and provide information regarding other nodes and data.

The HMII component enabling access of information between nodes may be developed by employing standard development tools and languages such as, but not limited to: Apache® components, Assembly, ActiveX, binary executables, (ANSI) (Objective-) C (++), C#and/or.NET, database adapters, CGI scripts, Java®, JavaScript®, mapping tools, procedural and object oriented development tools, PERL, PHP, Python®, shell scripts, SQL commands, web application server extensions, WebObjects, and/or the like. In one embodiment, the HMII server employs a cryptographic server to encrypt and decrypt communications. The HMII component may communicate to and/or with other components in a component collection, including itself, and/or facilities of the like. Most frequently, the HMII component communicates with the HMII database, operating systems, other program components, and/or the like. The HMII may contain, communicate, generate, obtain, and/or provide program component, system, user, and/or data communications, requests, and/or responses.

Distributed HMIIs

The structure and/or operation of any of the HMII node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the HMII controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D) COM), (Distributed) Object Linking and Embedding ((D) OLE), and/or the like), Common Object Request Broker Architecture (CORBA), local and remote application program interfaces Jini, Remote Method Invocation (RMI), process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. Again, the configuration will depend upon the context of system deployment.

APPENDICES 1-4 of U.S. Provisional Patent Application Ser. No. 60/986,561, which is incorporated herein by reference, detail aspects of embodiments to generate APPARATUSES, METHODS AND SYSTEMS FOR HIERARCHICAL MULTIDIMENSIONAL INFORMATION INTERFACES.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A computer-readable non-transitory storage medium encoded with processing instructions configured to be executed by a processor to cause the processor to:
   display, during a first time period, a first level of a hierarchical menu via an interactive display, the first level of the hierarchical menu including a menu cell associated with a second level of the hierarchical menu, a cursor disposed within the first level of the hierarchical menu during the first time period;
   receive, during a second time period after the first time period, an indication of the cursor, still disposed within the first level of the hierarchical menu, moving towards the menu cell; and
   display, during the second time period, a preview of the second level of the hierarchical menu extending over the first level of the hierarchical menu and towards the cursor, a size of the preview increasing as the cursor moves towards the menu cell.

2. The computer-readable non-transitory storage medium of claim 1, further comprising processing instructions configured to be executed by the processor to cause the processor to:
   receive, during a third time period after the second time period, an indication of movement of the cursor away from the menu cell; and
   display, during the third time period, the preview of the second level of the hierarchical menu retracting towards the first level of the hierarchical menu and away from the cursor, the size of the preview decreasing as the cursor moves away from the menu cell.

3. The computer-readable non-transitory storage medium of claim 1, further comprising processing instructions configured to be executed by the processor to cause the processor to:
   receive an indication that the cursor has entered the preview of the second level of the hierarchical menu;
   activate the second level of the hierarchical menu in response to the indication that the cursor has entered the preview of the second level; and
   deactivate the first level of the hierarchical menu in response to the indication that the cursor has entered the preview of the second level of the hierarchical menu.

4. The computer-readable non-transitory storage medium of claim 1, further comprising processing instructions configured to be executed by the processor to cause the processor to:

receive an indication that the cursor has entered the preview of the second level of the hierarchical menu;
activate the second level of the hierarchical menu in response to the indication that the cursor has entered the preview of the second level without receiving an indication that a user clicked the menu cell; and
deactivate the first level of the hierarchical menu in response to the indication that the cursor has entered the preview of the second level of the hierarchical menu.

5. The computer-readable non-transitory storage medium of claim 1, further comprising processing instructions configured to be executed by the processor to cause the processor to:
receive an indication that the cursor has entered the preview of the second level of the hierarchical menu;
activate the second level of the hierarchical menu in response to the indication that the cursor has entered the preview of the second level; and
deactivate the first level of the hierarchical menu in response to the indication that the cursor has entered the preview of the second level of the hierarchical menu, a portion of the first level of the hierarchical menu remaining in view after the first level of the hierarchical menu is deactivated.

6. The computer-readable non-transitory storage medium of claim 1, further comprising processing instructions configured to be executed by the processor to cause the processor to:
receive an indication that the cursor has entered the preview of the second level of the hierarchical menu;
activate the second level of the hierarchical menu in response to the indication that the cursor has entered the preview of the second level; and
deactivate the first level of the hierarchical menu in response to the indication that the cursor has entered the preview of the second level of the hierarchical menu, the second level of the hierarchical menu displayed on top of and partially covering the first level of the hierarchical menu when the second level of the hierarchical menu is activated.

7. The computer-readable non-transitory storage medium of claim 6, wherein the cursor moves in response to movement of a remote control.

8. The computer-readable non-transitory storage medium of claim 1, further comprising processing instructions configured to be executed by the processor to cause the processor to:
receive an indication that the cursor has entered the preview of the second level of the hierarchical menu;
activate the second level of the hierarchical menu in response to the indication that the cursor has entered the preview of the second level such that an entirety of the second level of the hierarchical menu is displayed on top of and partially covering the first level of the hierarchical menu;
receive, during a third time period after the second time period, an indication of movement of the cursor towards the partially covered first level of the hierarchical menu; and
display, during the third time period, the second level of the hierarchical menu retracting such that a size of a preview of the first level of the hierarchical menu increases as the cursor moves towards the partially covered first level of the hierarchical menu.

9. The computer-readable non-transitory storage medium of claim 1, further comprising processing instructions configured to be executed by the processor to cause the processor to:
receive an indication that the cursor has entered the preview of the second level of the hierarchical menu;
activate the second level of the hierarchical menu in response to the indication that the cursor has entered the preview of the second level such that an entirety of the second level of the hierarchical menu is displayed on top of and partially covering the first level of the hierarchical menu;
receive, during a third time period after the second time period, an indication of movement of the cursor towards the partially covered first level of the hierarchical menu;
display, during the third time period, the second level of the hierarchical menu retracting such that a size of a preview of the first level of the hierarchical menu increases as the cursor moves towards the partially covered first level of the hierarchical menu;
receive, during a fourth time period after the third time period, an indication that the cursor has entered the preview of the first level of the hierarchical menu;
deactivate the second level of the hierarchical menu in response to the indication that the cursor has entered the preview of the first level of the hierarchical menu; and
activate the first level of the hierarchical menu in response to the indication that the cursor has entered the preview of the first level of the hierarchical menu.

10. The computer-readable non-transitory storage medium of claim 9, wherein deactivating the second level of the hierarchical menu includes fully retracting the second level of the hierarchical menu.

11. The computer-readable non-transitory storage medium of claim 1, wherein the menu cell is a first menu cell, the computer-readable non-transitory storage medium further comprising processing instructions configured to be executed by the processor to cause the processor to:
receive, during the second time period, an indication that the cursor has entered the preview of the second level of the hierarchical menu;
activate the second level of the hierarchical menu in response to the indication that the cursor has entered the preview of the second level;
receive, during a third period after the second time period and during which the second level of the hierarchical menu is active, an indication of movement of the cursor towards a second menu cell associated with a third level of the hierarchical menu; and
display, during the third time period, a preview of the third level of the hierarchical menu extending over the second level of the hierarchical menu and towards the cursor, a size of the preview of the third level of the hierarchical menu increasing as the cursor moves towards the second menu cell.

12. The computer-readable non-transitory storage medium of claim 1, wherein the menu cell is a first menu cell, the computer-readable non-transitory storage medium further comprising processing instructions configured to be executed by the processor to cause the processor to:
receive, during the second time period, an indication that the cursor has entered the preview of the second level of the hierarchical menu;

activate the second level of the hierarchical menu in response to the indication that the cursor has entered the preview of the second level;

receive, during a third period after the second time period and during which the second level of the hierarchical menu is active, an indication of movement of the cursor towards a second menu cell associated with a third level of the hierarchical menu; and display, during the third time period, a preview of the third level of the hierarchical menu extending over the second level of the hierarchical menu and towards the cursor, a size of the preview of the third level of the hierarchical menu increasing as the cursor moves towards the second menu cell;

receive an indication that the cursor has entered the preview of the third level of the hierarchical menu;

activate the third level of the hierarchical menu in response to the indication that the cursor has entered the preview of the third level such that an entirety of the third level of the hierarchical menu is displayed on top of and partially covering the second level of the hierarchical menu, which is displayed on top of and partially covering the first level of the hierarchical menu.

13. The computer-readable non-transitory storage medium of claim 1, wherein the cursor moves in response to movement of an input device.

14. A computer-readable non-transitory storage medium encoded with processing instructions configured to be executed by a processor to cause the processor to:

display, during a first time period, a second level of a hierarchical menu via an interactive display, the second level of the hierarchical menu being a submenu of a first level of the hierarchical menu, the second level of the hierarchical menu displayed such that it overlays and partially covers the first level of the hierarchical menu, a cursor disposed within the second level of the hierarchical menu during the first time period;

receive, during a second time period after the first time period, an indication of the cursor, still within the second level of the hierarchical menu, moving towards the first level of the hierarchical menu; and display, during the second time period, the second level of the hierarchical menu retracting such that a size of a preview of the first level of the hierarchical menu disposed under the second level of the hierarchical menu, increases as the cursor moves towards the first level of the hierarchical menu.

15. The computer-readable non-transitory storage medium of claim 14, further comprising processing instructions configured to be executed by the processor to cause the processor to:

receive an indication that the cursor has entered the preview of the first level of the hierarchical menu;

activate the first level of the hierarchical menu in response to the indication that the cursor has entered the preview of the first level and without receiving an indication that a user clicked a portion of the preview of the first level; and deactivate the second level of the hierarchical menu in response to the indication that the cursor has entered the preview of the first level of the hierarchical menu.

16. The computer-readable non-transitory storage medium of claim 15 wherein deactivating the second level of the hierarchical menu includes fully retracting the second level of the hierarchical menu.

17. The computer-readable non-transitory storage medium of claim 14, wherein the cursor moves in response to movement of an input device.

18. The computer-readable non-transitory storage medium of claim 14, wherein the cursor moves in response to movement of a remote control.

* * * * *